United States Patent
Wong et al.

(10) Patent No.: US 11,755,546 B2
(45) Date of Patent: Sep. 12, 2023

(54) ATTRIBUTE AWARE RELATIONSHIP-BASED ACCESS CONTROL ON ROW AND FIELD LEVELS IN A RELATIONAL DATABASE

(71) Applicant: Salesforce, Inc., San Francisco, CA (US)

(72) Inventors: Mang Fu Matthew Wong, Castro Valley, CA (US); Subhash Uppalapati, San Ramon, CA (US); Jesse Wang, Seattle, WA (US); Sunghyun Song, San Diego, CA (US); Federico Recio, Bethlehem, PA (US); Jesse Collins, Oakland, CA (US)

( * ) Notice: Subject to any disclaimer, the term of this patent is extended or adjusted under 35 U.S.C. 154(b) by 0 days.

(21) Appl. No.: 17/326,610

(22) Filed: May 21, 2021

(65) Prior Publication Data

US 2022/0374397 A1 Nov. 24, 2022

(51) Int. Cl.
*G06F 16/21* (2019.01)
*G06F 16/2455* (2019.01)
*G06F 16/28* (2019.01)

(52) U.S. Cl.
CPC ........ *G06F 16/211* (2019.01); *G06F 16/2456* (2019.01); *G06F 16/284* (2019.01)

(58) Field of Classification Search
CPC ........................... G06F 16/284; G06F 16/2456
USPC .......................................................... 707/694
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |

(Continued)

OTHER PUBLICATIONS

Fogel et al.: "Oracle® Database Administrator's Guide", 10g Release 2 (10.2), Primary Author: Steve Fogel, May 2006, hereafter "OAGuide" (Year: 2006).*

*Primary Examiner* — Kuen S Lu

(57) ABSTRACT

Systems and methods are described for implementing attribute aware, relationship-based access control by receiving a query to access a relational database from a user, determining if a rule of the relational database is applicable to the query, determining one or more relationships associated with the query based at least in part on the rule, and modifying the query by adding an extra join operation to the query based at least in part on the rule and the one or more relationships. Further, when a type of the rule is row level, a where clause filter is added to the modified query to enforce a condition of the rule, and when the type of the rule is field level, a case column is added to the modified query and a select clause is added to the modified query to wrap the query. The modified query is processed to produce a result.

20 Claims, 7 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 10,157,234 B1 * | 12/2018 | Alagappan .......... G06F 16/2452 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2015/0154381 A1 * | 6/2015 | Stephenson .......... G06F 16/248 707/722 |

\* cited by examiner

|     | 202 | 204   | 206        | 208     |
|-----|-----|-------|------------|---------|
|     | EID | BONUS | MANAGER ID | USER ID |
| 210 | 1   | $5,000 | 2         | 1001    |
| 211 | 2   | $5,000 | 3         | 1002    |
|     | 3   | $10,000 | 8        | 1003    |

|     | 202 | 204   | 206        | 208     |
|-----|-----|-------|------------|---------|
|     | EID | BONUS | MANAGER ID | USER ID |
| 210 | 1   | $5,000 | 2         | 1001    |
| 212 | /////////// | /////////// | /////////// | /////////// |

|     | 202 | 204   | 206        | 208     |
|-----|-----|-------|------------|---------|
|     | EID | BONUS | MANAGER ID | USER ID |
| 210 | 1   | $5,000 | 2         | 1001    |
|     | 2   | /////// | 3         | 1002    |
|     | 3   | /////// | 8         | 1003    |

ATTRIBUTE AWARE RELATIONSHIP-BASED ACCESS CONTROL ON ROW AND FIELD LEVELS IN A RELATIONAL DATABASE

TECHNICAL FIELD

One or more implementations relate to relational databases in a multi-tenant computing environment, and more specifically, to attribute aware relationship-based access control on row and field levels in a relational database.

BACKGROUND

A commonly used computing resource is a relational database. A relational database is a type of database that allows a user to identify and access a first data item in relation to a second data item in the database. A relational database is often organized into tables. Tables can have hundreds, thousands, or even millions of rows of data. These rows are often called records. Tables can also have many columns of data (also called fields). Columns are labeled with a descriptive name ("age" for example) and have a specific data type.

Attribute-based access control (ABAC), also known as policy-based access control, defines an access control paradigm whereby access rights are granted to users of a database through the use of policies which combine attributes. The policies can use any type of attributes (user attributes, resource attributes, objects, environment attributes etc.). This model supports Boolean logic, in which rules contain "IF, THEN" statements about who is making the request, the resource, and the action. For example: IF the requester is a manager, THEN allow read/write access to sensitive data. ABAC uses attributes of a record to help determine access to the record in a database.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

FIGS. 2A, 2B, and 2C are example tables according to some embodiments.

DETAILED DESCRIPTION

Embodiments of the present invention comprise a method and system for implementing ABAC that considers attributes on other records that are related to a first record when processing a query in multi-tenant computing environments.

When a user's request to access a record (e.g., the query) is evaluated, the first record's relationships with the other records are considered and, if the attributes of the related other records match the criteria being evaluated against, the user is given access. As used herein, an attribute refers to a value of a field in a record. Embodiments of the present invention are multi-tenant aware and work with tenant-specific schemas.

In existing computing systems there is no capability for implementing attribute-based, relationship-aware ABAC on either the row level (rows) or the field level (columns) of records in a relational database. It has not been possible to specify that a user's access to a first record is based on an attribute that is related to the user but that is not in the first record. For example, consider user X and database record A. It is possible to provide that user X should have access to record A, if A has an attribute Q that matches some formula relating Q and user X, but it has not been possible to provide that user X has access to record A because record A has a foreign key pointing to record B (and so on), and record B has an attribute R that matches a formula relating R and X with general support of foreign keys from A to B and any kinds of entities. Embodiments of the present invention provide this capability in a multi-tenant computing environment and allow the established relationship between the attribute and the user to determine access by the user to either the entire record, or parts of the record.

Some embodiments are implemented in a multi-tenant computing environment supporting a multi-tenant-aware relational database. Embodiments provide attribute-aware, relationship-based access control for a plurality of tenants in the multi-tenant computing environment regardless of tenant organization parameters and relations.

Embodiments enable a system administrator to specify a relationship formula (e.g., an access control rule) that can span beyond the immediate record being processed (e.g., A.fk1.fk2.attr1='value') when defining an access control rule for this tenant/user. When the rule is processed, a query processor generates one or more extra relational joins to the relations (e.g., to both fk1 and fk2), both of which may be tenant specific. Depending on whether the rule specifies a row level or field level condition, extra filters are added over the where clause (for the row level) or the select clause (for the field level) to remove access to selected rows or fields.

Figure 1:
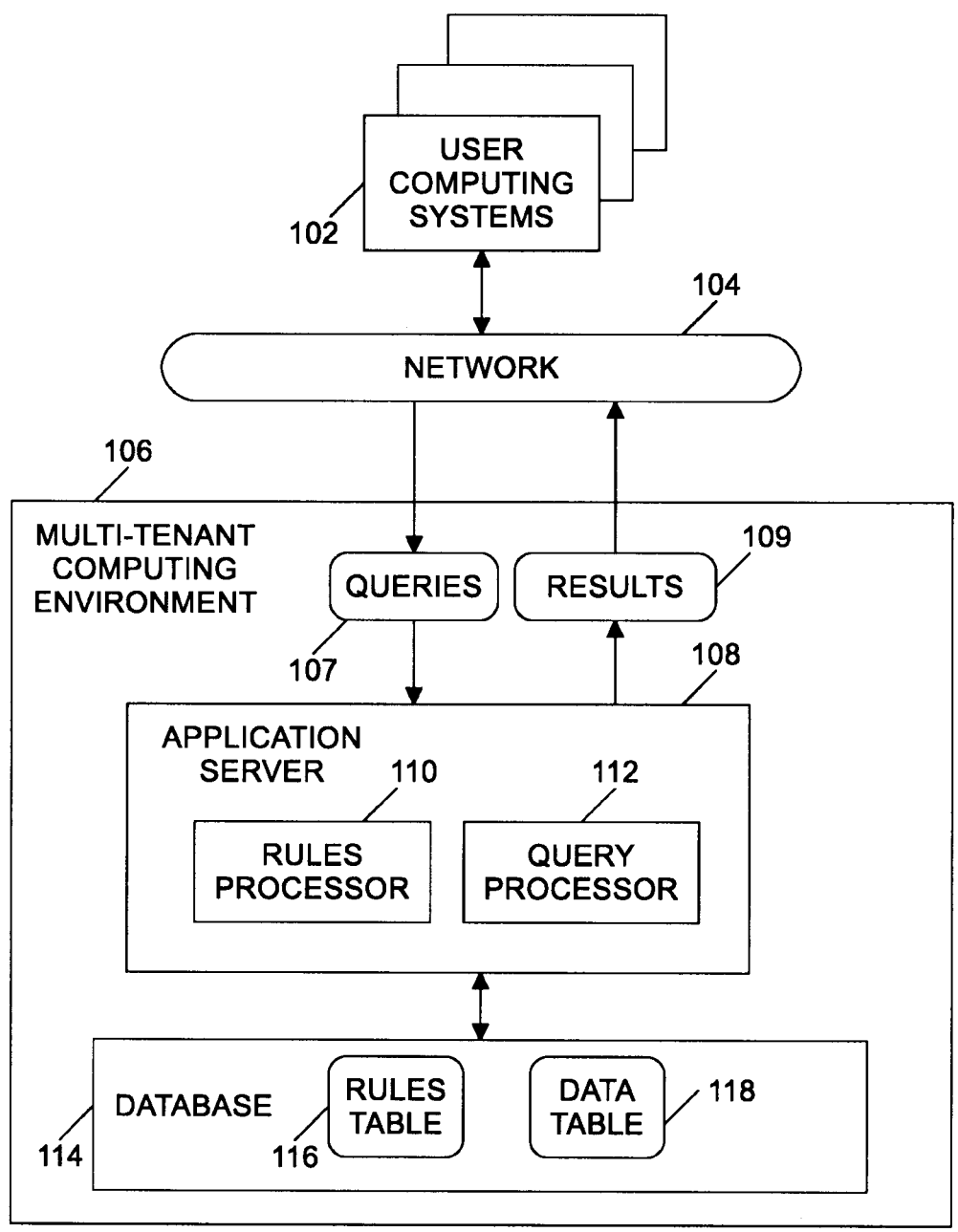
FIG. 1 illustrates an example multi-tenant computing environment having a database according to some embodiments.

FIG. 1 illustrates an example 100 multi-tenant computing environment 106 having a database 114 according to some embodiments. A plurality of users operating user computing systems 102 access multi-tenant computing environment 106 over network 104. Multi-tenant computing environment 106 comprises a plurality of computer servers, storage devices, network interfaces (e.g., switches, routers, etc.), and other equipment to run computer applications for users. Multi-tenant computing environment comprises at least one database 114. In an embodiment, database 114 is a relational database. Database 114 comprises at least one data table 118 storing data in records and at least one rules table 116 to store rules governing access to the data in data table 118. At least one of the servers in the multi-tenant computing environment is application server 108. Application server 108 comprises rules processor 110 to define rules and query processor 112 to process queries 107 received from users. In an embodiment, rules processor 110 is implemented in one application server, and query processor 112 is implemented in another application server.

A user interacts with user computing system 102 to access applications, such as database 114, supported by application server 108 over one or more computer or communications networks 104 (e.g., an intranet, the Internet, WiFi, cellular, etc.). Examples of user computing systems include laptop and desktop personal computers, smart phones, tablet computers, personal digital assistants (PDAs), smart home appliances, home networking equipment, and so on. In some scenarios, multi-tenant computing environment 106, comprising a plurality of application servers 108, is operated by a cloud service provider (CSP) and may be replicated in data centers distributed in sites throughout the world. In an embodiment, application server 108 accepts one or more queries 107 from user computing systems 102, processes those queries (which may involve accessing data in data table 118 of database 114 using rules in rules table 116 of database 114), and returns results 109 as responses to queries 107 to the user computing systems 102.

There is a business and security need when providing relational databases to ensure that a selected record and/or fields of the selected record can be hidden or be made visible during processing of a query of the record based on one or more rules between the row, a related record (or records) related to the row, the attributes on the related record, and the user requesting the query. In other words, for a particular row, based on the relationship between a value and a row related to the row in question and the user, application of one or more rules determine if the row in question and/or some fields should be visible or otherwise accessible to the user.

As used herein, "dot" notation describes relationships between records and parts of records. For example, A.B.C denotes that entity A has a field B, and if B is a foreign key (that is, B points outside of A's record), B can be "dot notated" to traverse to the field that B points to (in this case, terminating at the C field).

FIGS. 2A, 2B, and 2C are example tables according to some embodiments. Employee table 200, for example, represents at least a portion of data table 118 of database 114. In FIG. 2A, employee table 200 includes at least the fields (columns) of employee identifier (EID) 202, bonus 204, manager ID 206, and user ID 208. Manager ID 206 is a key to another row in this relation (e.g., another row in employee table 200). User ID 208 refers to a user and is a key to another relation, in another table (thus, user ID is a foreign key). In this example, row 210 has a manager ID 206 of 2, and this manager's row is row 211 (because EID 202 in row 211 is 2). If the current user has user ID of 1002 (the current user is the manager with manager ID=2), let's denote this as $(current user).ID=1002. If there is a rule in rules table 116 that allows access to an employee's record in employee table 200 if "Employee.Manager.User=$(Current user).ID" then, for example, the current user (the manager) can see his or her employee's record if Employee.Manager.User=$(Current user).ID and the rule is a row level rule. This outcome is shown in FIG. 2B. The user (manager) can access row 210 for employee EID=1, but the other rows in area 212 are hidden and inaccessible. If there is a rule in rules table 116 that allows access to the bonus fields 204 of a manager's employees if "Employee.Manager.User=$(Current user).ID" then, for example, the current user (manager) can see bonus fields if "Employee.Manager.User=$(Current user).ID" and the rule is a field level rule. This outcome is shown in FIG. 2C. The user (manager) can access bonus field 204 but only for his or her own employees (in this case, only the employee having EID=1), but the fields in area 214 are hidden and inaccessible.

Figure 3A:
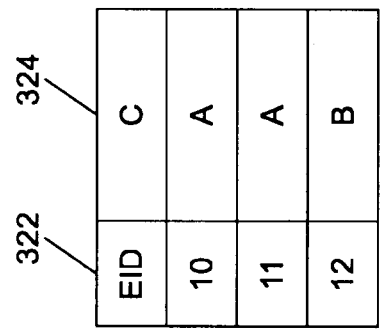
FIGS. 3A, 3B, 3C, and 3D are example tables according to some embodiments.
Figure 3B:
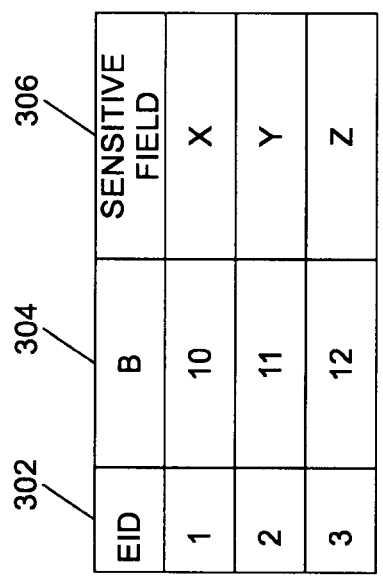
Figure 3D:
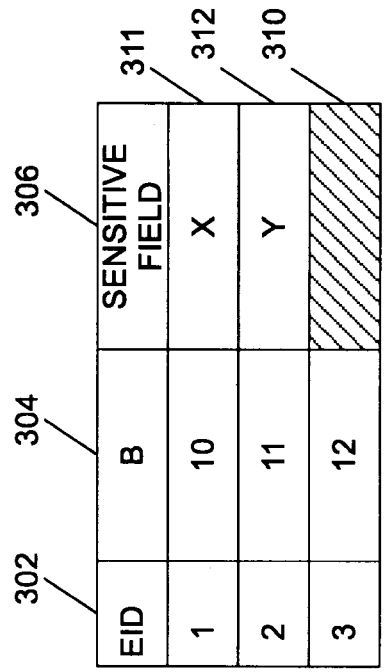
Figure 3C:
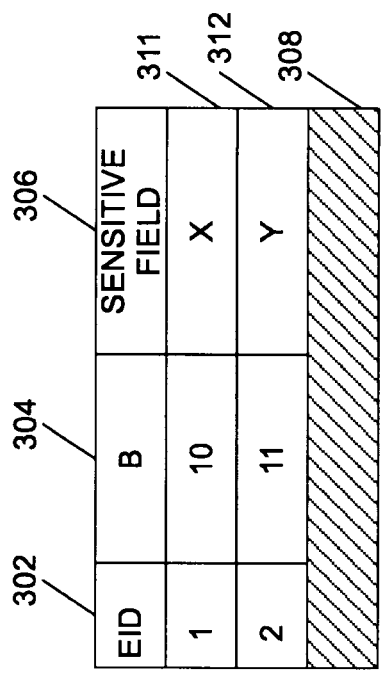

The example of FIGS. 2A, 2B, and 2C can be generalized. FIGS. 3A, 3B, 3C, and 3D are example tables according to some embodiments. For example, a rule may state "allow access if A.B.C=$(current user).X". Where A is a relation being restricted (in the example of FIG. 2 this is the employee), B is a field in A that is a key to a relation (which may point to A, as in the employee example, or to another relation in another table), and C is a field in B (which depends on what B is), the rule allows access if evaluation of the rule's equation is true. An example where B does not point back to A is shown in FIG. 3A. Employee table 300 includes at least three fields: EID 302, B 304, and sensitive field 306. FIG. 3B shows an example of table B 320. Table B 320 includes at least two fields: EID 322 and C 324. If $(current user).X=A, and if an example rule is "allow access to A records if A.B.C=$(current user).X" then the user would have access to rows 311 and 312 as shown in FIG. 3C. Area 308 is hidden and inaccessible. If another example rule is "allow access to sensitive fields 306 of table A 300 if A.B.C=$(current user).X" then the user would have access to rows 311 and 312, and columns 302 and 304 as shown in FIG. 3D. Area 310 is hidden and inaccessible.

Figure 4:
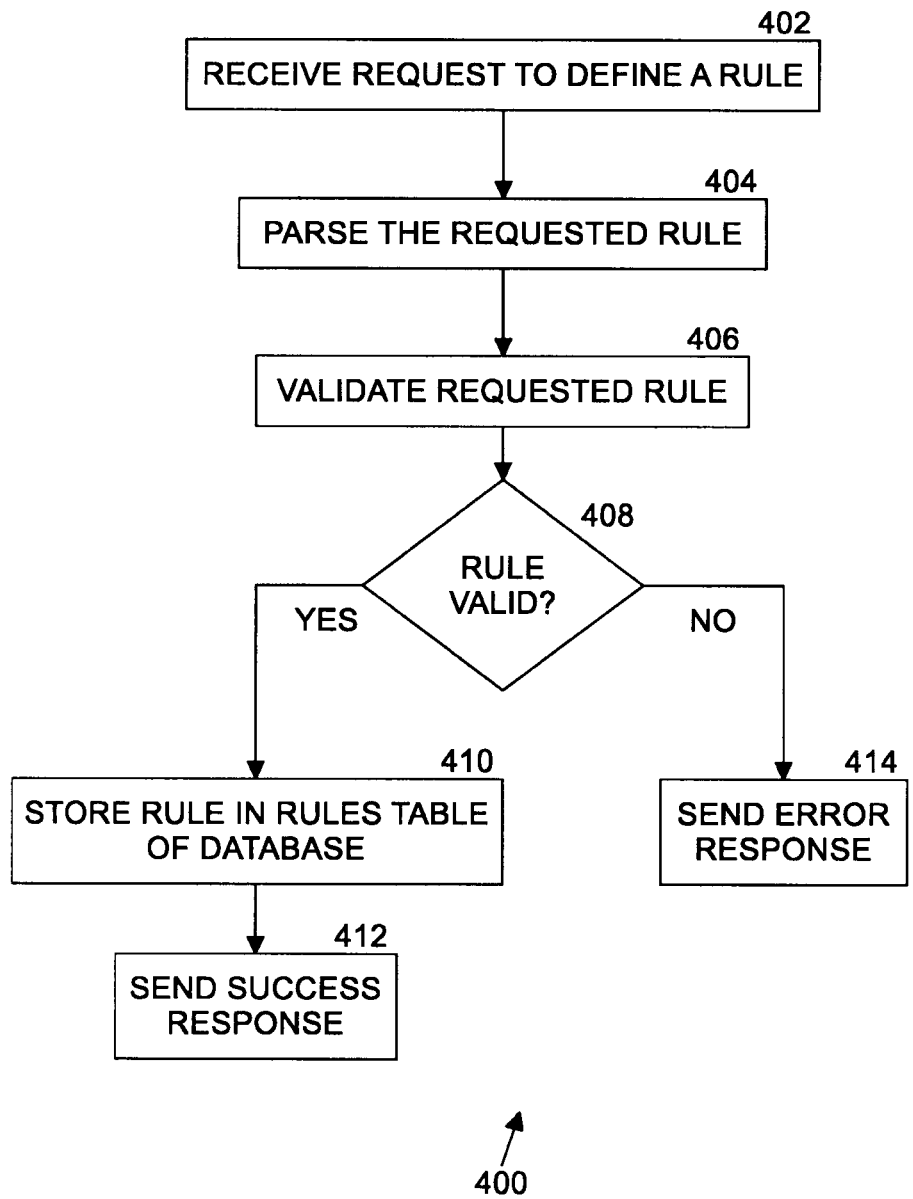
FIG. 4 is a flow diagram of rule definition processing according to some embodiments.

FIG. 4 is a flow diagram of rule definition processing 400 according to some embodiments. In one embodiment, rules are defined by a system administrator of database 114, application server 108, or multi-tenant computing environment 106. In an embodiment, the system administrator operates a computing system coupled to application server 108 but having a different role for accessing database 114 than ordinary users.

A rule as defined by the system administrator can be either a row level restriction or a field level restriction specifying under what circumstances a record (or part thereof) of a table is visible and accessible to the current user. A rule always spans relations (e.g., the rule includes at least two dots). Rules can include any number of levels of indirection (e.g., relations/dots). Rules can enforce various criteria and requirements. For example, a rule may apply if the current user has a particular role or if the user has a particular access permission set.

At block 402, rules processor 110 of application server 108 receives a request to define a rule for allowing accesses by one or more users to data in one or more data tables 118 of database 114. At block 404, rules processor parses the rule, and at block 406 validates the rule against a schema of database 114 in the context of a tenant (e.g., an organization of users). As used herein, schema comprises at least one definition of tables and fields, and the relationships between tables and fields, in database 114. In one embodiment, a schema may define data table 118 for all users of database 114. In another embodiment, a schema may define data table 118 for one or more users comprising a tenant (e.g., an organization of users) of database 114. If the rule is valid according to the schema (or if in a multi-tenant environment, the schema of the current tenant), rules processor 110 stores the rule in rules table 116 of database 114, and then sends a success response at block 412 back to requestor (e.g., the system administrator). If the rule is invalid according to the schema and the current tenant, rules processor 110 sends an error response back to the requester.

In an embodiment, rules processor 110 is combined with query processor 112 into a single component. In an embodiment, this single component is a relational database management system (RDBMS). An RDBMS is a computer program for creating, updating, and administering a relational database. In an embodiment, the RDBMS includes database 114.

Figure 5:
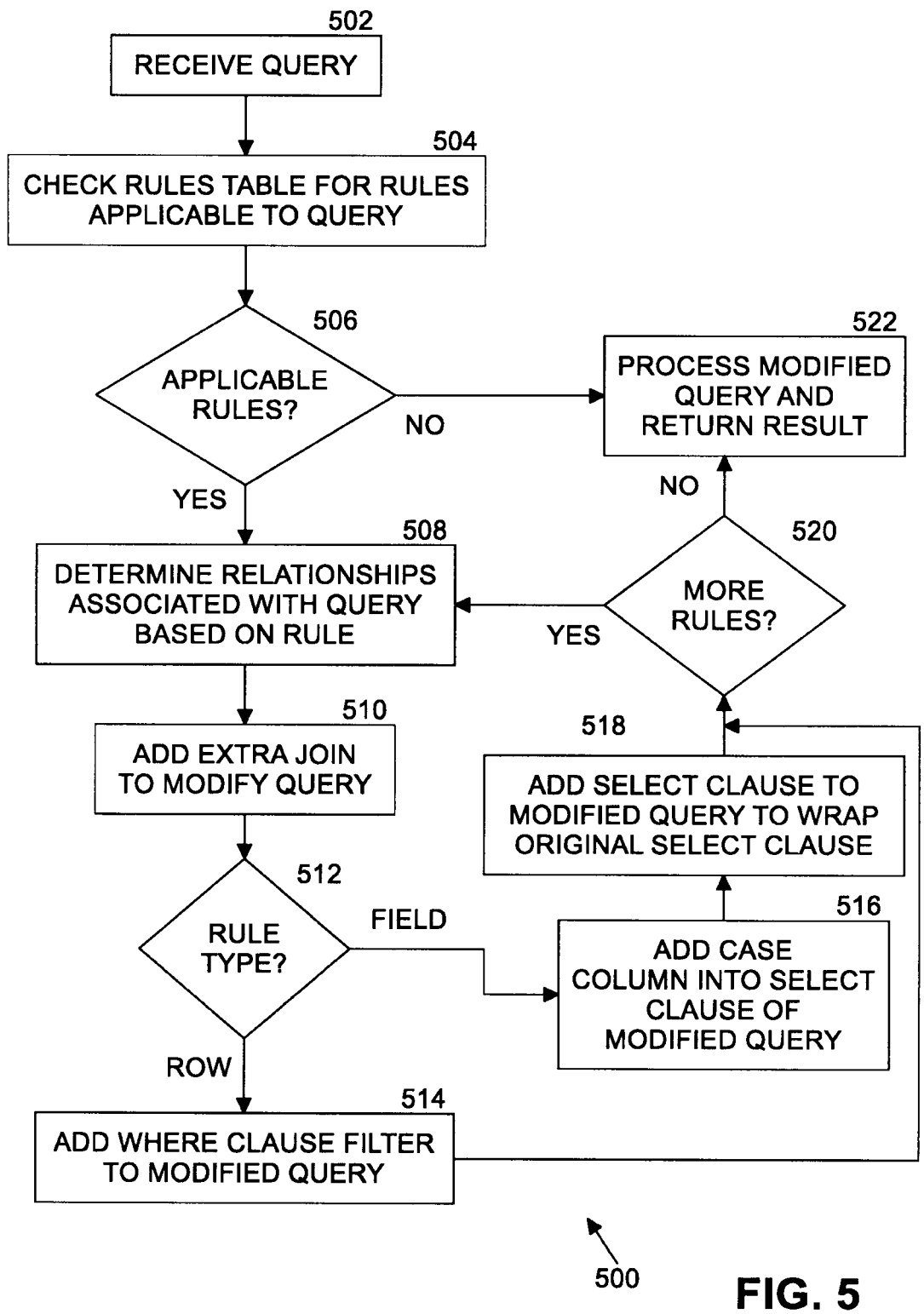
FIG. 5 is a flow diagram of query processing according to some embodiments.

FIG. 5 is a flow diagram of query processing 500 according to some embodiments. When the desires to access one or more tables and/or records of data table 118 of database 114, the user sends a request specifying a query 107 to application server 108. In various embodiments, the request may be communicated through a user interface (UI), an application programming interface (API), a report generator, etc. At block 502, query processor 112 of application server 108 receives query 107. In an embodiment, the query is written in SQL or other query languages. At block 504, the query processor checks the rules table 116 for any one or more rules that are applicable to the query. If there are no rules that are applicable to the query, query processor 112 processes the query at block 522 and returns the result 109 to the requester. Results 109 comprise data retrieved from data table 118 of database 114 according to the query parameters.

If there is at least one rule that is applicable to the query, at block 508 query processor 112 determines relationships associated with the query based at least in part on the rule. The rule is applicable to the query if the query is to a record, field or table that matches the rule's records, fields, or tables. In an embodiment, if the rule specifies that the rule should take effect for a set of users and the current user is in the set, then the rule may be considered applicable as above.

Query processor extracts all relationships for data of data table 116 based on the rule. For example, the query processor parses "Employee.Manager.User" (as part of an applicable rule) and determines that the query needs to consider ".Manager" and then. "User" on preceding relations (e.g., "Employee"). The query processor also checks the relations against the schema of data table 118 and determines if a relation refers to a foreign key (e.g., ".Manager" relating back to "Employee"). The query processor can then find that ".User" is a key in a User table, for example.

After relationships are determined, query processor 112 modifies the query according to the rule and the relationships. At block 510, query processor transforms the original query to perform an extra join operation. For example, an extra join is added to the original query to the Employee table 200 to look up the value for that record's ".User" field. In an embodiment, the extra join is determined by analyzing the schema. For example, if a rule states that there is a need to consider A.B.C, the schema for A determines what A.B points to, the corresponding schema for that relation determines what .C point to, and so on. Based on the schema, the query processor finds that Employee.Manager, for example, is a foreign key relating back to Employee, so query processor appends an extra join operation to Employee (the original Employee relation may be referred to as A and the extra join to the Employee relation as B):
SELECT . . . . FROM Employee A, Employee B WHERE A.Manager=B.id In an embodiment, this action comprises, for each part in a path (e.g., traversal of relationships for A.B.C meaning start at A, parse the B field on A, traverse to B, then parse the C field, and so on), adding a FROM table and a corresponding extra filter (in a WHERE clause) to the original query. Thus, the original query is transformed into a modified query. Next, at block 512, if the rule type of the current rule is row level, then at block 514 query processor 112 adds a WHERE clause filter to the modified query to enforce the rule's condition (resulting in an extra WHERE clause to constrain on B.User=(Current user), for example).
SELECT . . . . FROM Employee A, Employee B
WHERE . . . . (Employee B WHERE A.Manager=B.ID) AND
(B.User=(Current User))

Processing then continues with block 520, where query processor 112 determines if there are more rules to process. If not, the modified query is processed at block 522 and the result is returned to the requester (e.g., the user). If there are more rules to process, processing continues with handling the next applicable rule at block 508.

If the rule type is field level at block 512, then the query processor checks if the rule applies to a field of the rule. If a field that is affected is encountered, the query processor adds a CASE select clause reflecting the rule to the modified query. For example, based on the Employee A having joined Employee B described above, the original query's select clause gets, for the field in question (e.g., Bonus) an extra synthetic column (for example, Bonus_Vis) created as follows:
CASE WHEN (B.User=(Current User)) THEN 1 ELSE NULL END AS "Bonus_Vis"

Thus, a CASE column is added into the SELECT clause of the modified query at block 516. At block 518, the modified query gets further wrapped, so that the original Bonus column, for example, considers the Bonus_Vis result:
SELECT . . . NVL2 ("Bonus_Vis", "Bonus", null) as BONUS . . . FROM
(SELECT . . .
CASE WHEN (B.USER=(Current User)) THEN 1 ELSE NULL END AS "Bonus_Vis" . . .
FROM Employee A, Employee B
WHERE . . . . (Employee B WHERE A.Manager=B.ID))

Thus, query processor 112 adds a SELECT clause to the modified query to wrap (e.g., (e.g., specify a structured query language (SQL) select operation over another SQL select operation) the original SELECT clause.

The end result of processing the modified query is that when returning to the user, Bonus depends, for example, on Bonus_Vis, which in turn depends on whether the criteria for accessing B.user is met. After the field level rule is processed at block 518, query processing moves to block 520 for a consideration of additional rules.

This processing can be extended to any level of nested dots, which results in extra joins.

Example Electronic Devices and Environments. One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, computer server, cloud computing server, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, tablet computers, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
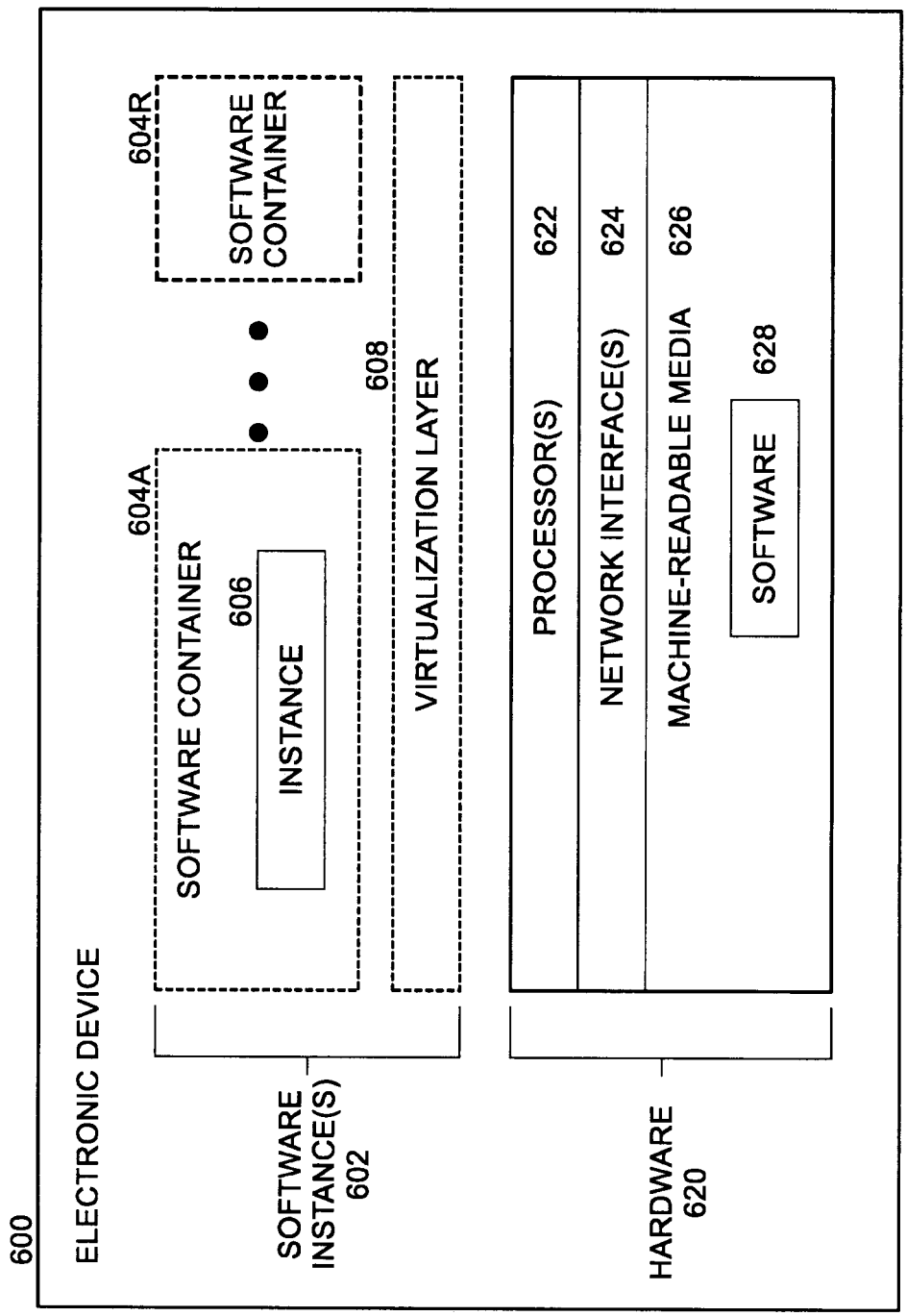
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 626 (wireless and/or wired), and machine-readable media 626 having stored therein software 628 (which includes instructions executable by the set of one or more processor(s) 622). The machine-readable media 626 may include non-transitory and/or transitory machine-readable media. Each of the previously described clients/user devices and application server 108 and database 114 may be implemented in one or more electronic devices 600. In one implementation: 1) each of the clients/user devices is implemented in a separate one of the electronic devices 600 (e.g., in end user devices where the software 628 represents the software to implement clients to interface directly and/or indirectly with the application server 108 (e.g., software 628 represents a web browser, a native client, a portal, a command-line interface, and/or an application programming interface (API) based upon protocols such as Simple Object Access Protocol (SOAP), Representational State Transfer (REST), etc.)); 2) the application server 108 is implemented in a separate set of one or more of the electronic devices 600 (e.g., a set of one or more server devices where the software 628 represents the software to implement the application server 108); and 3) in operation, the electronic devices implementing the clients/user devices and the application server 108 would be communicatively coupled (e.g., by a network) and would establish between them (or through one or more other layers and/or or other services) connections for sending requests and receiving single pages.

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-404R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative implementations of an electronic device may have numerous variations from that described above. For example, customized hardware and/or accelerators might also be used in an electronic device.

Figure 6B:
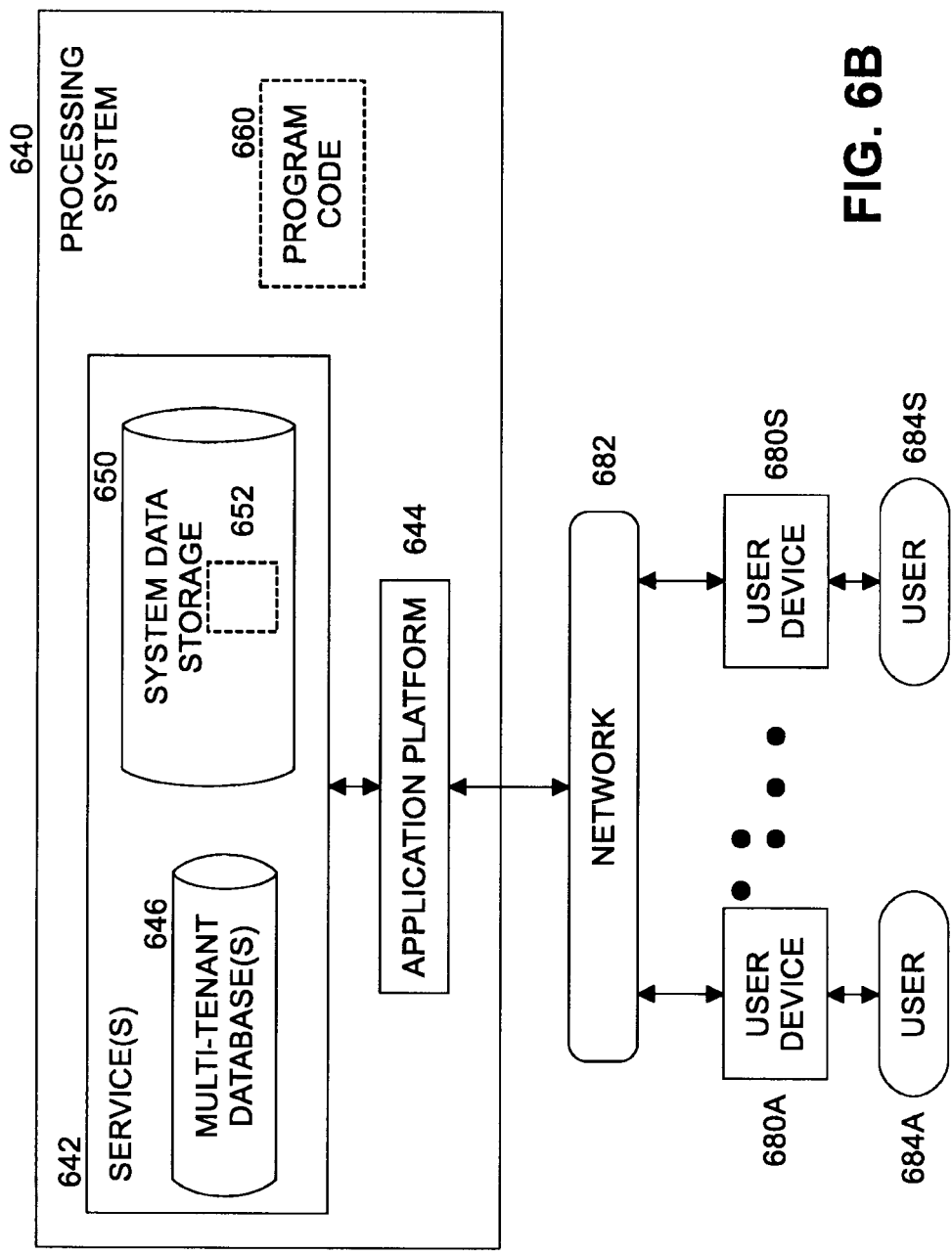
FIG. 6B is a block diagram of a deployment environment according to some example implementations.

Example Environment. FIG. 6B is a block diagram of a deployment environment according to some example implementations. A processing system 640 includes hardware (e.g., a set of one or more server devices) and software to provide service(s) 642, including application server 108. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The processing system 640 is coupled to user devices 680A-680S over a network 682. The service(s) 642 may be on-demand services that are made available to one or more of the users 684A-684S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-684S). The service(s) 642 may communicate with each other and/or with one or more of the user devices 680A-680S via one or more APIs (e.g., a REST API). In some implementations, the user devices 680A-680S are operated by users 684A-684S, and each may be operated as a client device and/or a server device. In some implementations, one or more of the user devices 680A-680S are separate ones of the electronic device 600 or include one or more features of the electronic device 600. In some embodiments, service(s) 642 includes services provided by application server 108.

In some implementations, the processing system 640 is a multi-tenant system (also known as a multi-tenant architecture), e.g., multi-tenant computing environment 106. The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 640 is a multi-tenant cloud computing architecture supporting multiple services, such as one or more of the following types of services: schema inference and event validation processing, Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 640 may include an application platform 644 that enables PAAS for creating, managing, and executing one or more applications developed by the provider of the application platform 644, users accessing the system 640 via one or more of user devices 680A-680S, or third-party application developers accessing the system 640 via one or more of user devices 680A-680S.

In some implementations, one or more of the service(s) 642 may use one or more multi-tenant databases 646 (e.g., database 114), as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user devices 680A-680S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the multi-tenant database(s) 646 and/or system data storage 650.

In some implementations, the service(s) 642 are implemented using virtual applications dynamically created at run time responsive to queries from the user devices 680A-680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including those run on application server 108, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols and may include one or more intermediary devices for routing data between the system 640 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-684S to interact with various GUI pages that may be presented to the one or more of users 684A-684S. User devices 680A-680S might communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-684S of the user devices 680A-680S to access, process and view information, pages and applications available to it from system 640 over network 682.

Conclusion. In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™, or Python using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A computer-implemented method comprising:
   receiving a query to access a record of a relational database from a client device;
   determining if a rule of the relational database is applicable to the query, wherein the rule specifies a record in the relational database, and the rule is applicable to the query if the query is directed to the record;
   determining one or more relationships associated with the query based at least in part on the rule, wherein the relationships include a relationship between the record and an attribute of a second record;
   modifying the query by adding an extra join operation to the query based at least in part on the rule and the attribute of the second record;
   if a type of the rule is row level, adding a where clause filter to the modified query to enforce a condition of the rule;
   if the type of the rule is field level, adding a case column to the modified query and adding a select clause to the modified query to wrap the query; and
   processing the modified query to produce a result.

2. The computer-implemented method of claim 1, further comprising adding the extra join operation to the query based at least in part on a schema of the user.

3. The computer-implemented method of claim 1, further comprising adding the extra join operation to the query based at least in part on a schema of a tenant including the user and other users.

4. The computer-implemented method of claim 1, further comprising performing the receiving, determining, modifying, adding, and processing by a relational database management system in a multi-tenant computing environment.

5. The computer-implemented method of claim 1, wherein processing the modified query determines access by the user to one of the record of the relational database, parts of the record, or related fields in other records of the relational database.

6. The computer-implemented method of claim 1, wherein processing the modified query determines whether the record of the relational database is visible or accessible to the user.

7. The computer-implemented method of claim 1, wherein the rule defines access control to the record of the relational database for the user.

8. A non-transitory machine-readable storage medium providing instructions that, if executed by one or more processing resources, are configurable to cause the one or more processing resources to perform operations comprising:
   obtaining a query to access a record of a relational database from a client device;
   determining if a rule of the relational database is applicable to the query, wherein the rule specifies a record in the relational database, and the rule is applicable to the query if the query is directed to the record;
   determining one or more relationships associated with the query based at least in part on the rule, wherein the relationships include a relationship between the record and an attribute of a second record;
   modifying the query by adding an extra join operation to the query based at least in part on the rule and the attribute of the second record;
   if a type of the rule is row level, adding a where clause filter to the modified query to enforce a condition of the rule;
   if the type of the rule is field level, adding a case column to the modified query and adding a select clause to the modified query to wrap the query; and
   processing the modified query to produce a result.

9. The non-transitory machine-readable storage medium of claim 8, providing instructions that, if executed by one or more processing resources, are configurable to cause the one or more processing resources to perform adding the extra join operation to the query based at least in part on a schema of the user.

10. The non-transitory machine-readable storage medium of claim 8, providing instructions that, if executed by one or more processing resources, are configurable to cause the one or more processing resources to perform adding the extra join operation to the query based at least in part on a schema of a tenant including the user and other users.

11. The non-transitory machine-readable storage medium of claim 8, providing instructions that, if executed by one or more processing resources, are configurable to cause the one or more processing resources to perform receiving, determining, modifying, adding, and processing by a relational database management system in a multi-tenant computing environment.

12. The non-transitory machine-readable storage medium of claim 8, providing instructions that, if executed by one or more processing resources, are configurable to cause the one or more processing resources to perform processing of the modified query by determining access by the user to one of the record of the relational database, parts of the record, or related fields in other records of the relational database.

13. The non-transitory machine-readable storage medium of claim 8, providing instructions that, if executed by one or more processing resources, are configurable to cause the one or more processing resources to perform processing of the modified query by determining whether the record of the relational database is visible or accessible to the user.

14. The non-transitory machine-readable storage medium of claim 8, wherein the rule defines access control to the record of the relational database for the user.

15. A system comprising:
an electronic device having a relational database implemented therein; and
a query processor configured to:
obtain a query to access a record of a relational database from a client device;
determine if a rule of the relational database is applicable to the query,
wherein the rule specifies a record in the relational database, and the rule is applicable to the query if the query is directed to the record;
determine one or more relationships associated with the query based at least in part on the rule,
wherein the relationships include a relationship between the record and an attribute of a second record;
modify the query by adding an extra join operation to the query based at least in part on the rule and the attribute of the second record;
if a type of the rule is row level, add a where clause filter to the modified query to enforce a condition of the rule;
if the type of the rule is field level, add a case column to the modified query and adding a select clause to the modified query to wrap the query; and
process the modified query to produce a result.

16. The system of claim 15, wherein the query processor is configured to add the extra join operation to the query based at least in part on a schema of the user.

17. The system of claim 15, wherein the query processor is configured to add the extra join operation to the query based at least in part on a schema of a tenant including the user and other users.

18. The system of claim 15, wherein the query processor is configured to process the modified query by determining access by the user to one of the record of the relational database, parts of the record, or related fields in other records of the relational database.

19. The system of claim 15, wherein the query processor is configured to process the modified query by determining whether the record of the relational database is visible or accessible to the user.

20. The system of claim 15, wherein the rule defines access control to the record of the relational database for the user.

* * * * *